(12) United States Patent
Sekiya et al.

(10) Patent No.: US 9,930,615 B2
(45) Date of Patent: Mar. 27, 2018

(54) RELAY DEVICE

(71) Applicants: DENSO CORPORATION, Kariya, Aichi-pref. (JP); NIPPON SOKEN, INC., Nishio, Aichi-pref. (JP)

(72) Inventors: Youhei Sekiya, Nishio (JP); Hiroyuki Mori, Nishio (JP); Yoshifumi Kaku, Kariya (JP); Shogo Akasaki, Kariya (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 63 days.

(21) Appl. No.: 15/235,324

(22) Filed: Aug. 12, 2016

(65) Prior Publication Data

US 2017/0064623 A1    Mar. 2, 2017

(30) Foreign Application Priority Data

Aug. 24, 2015  (JP) ................................. 2015-164916

(51) Int. Cl.
*H04B 3/36*    (2006.01)
*H04W 52/02*   (2009.01)

(52) U.S. Cl.
CPC .......... *H04W 52/0206* (2013.01); *H04B 3/36* (2013.01); *H04W 52/0229* (2013.01); *Y02B 60/50* (2013.01)

(58) Field of Classification Search
CPC .... H04W 88/04; H04W 52/0206; H04B 3/21; H04B 3/36; H04B 3/42
See application file for complete search history.

(56) References Cited

U.S. PATENT DOCUMENTS

| 2009/0285221 | A1  | 11/2009 | Ito |
| 2012/0063356 | A1  | 3/2012  | Ito |
| 2013/0106616 | A1* | 5/2013  | Gustafsson .............. H04Q 9/00 340/870.02 |
| 2015/0282039 | A1* | 10/2015 | Park .................... H04W 40/005 370/311 |

FOREIGN PATENT DOCUMENTS

JP          2005045521 A    *  2/2005

* cited by examiner

*Primary Examiner* — Wesley Kim
*Assistant Examiner* — Dong-Chang Shiue
(74) *Attorney, Agent, or Firm* — Posz Law Group, PLC

(57) ABSTRACT

A relay device includes a communication signal relay unit for relaying a communication signal and a wake-up signal relay unit for relaying, by bypassing the communication signal relay unit, a wake-up signal that is transmitted using a frequency band which is lower than a communication frequency band used in transmitting the communication signal. The communication signal relay unit includes a low frequency wave attenuation unit for attenuating a signal with a frequency band lower than the communication frequency band. The wake-up signal relay unit includes a wake-up signal filter unit for passing through a signal with a frequency band lower than the communication frequency band.

5 Claims, 6 Drawing Sheets

RELAY DEVICE

CROSS REFERENCE TO RELATED APPLICATION

This application is based on Japanese Patent Application No. 2015-164916 filed on Aug. 24, 2015, the disclosure of which is incorporated herein by reference.

TECHNICAL FIELD

The present disclosure relates to a relay device used in a network system in which nodes can wake up individually.

BACKGROUND

In a known technology, when a predetermined sleep condition is fulfilled, a communication system transitions to a sleep mode limiting a function of each node to reduce power consumption of an overall system.

Further, there is known a method for transition of each node from the sleep mode to a wake-up mode in which the function limitation is removed. In this method, a wake-up signal is transmitted from a switch (relay device) using the same frame format as signals for ordinary communications between nodes are transmitted (refer to JP-A-2013-150346). In the above, the switch relays the signal to a transmission path to which the node is connected.

In the above technology, because the frame used for the wake-up signal is the same as those for ordinary communications, even after every node has transitioned to the sleep mode, the relay device has its all ordinary communication functions operable in order to process the wake-up signal. Because of this, the power consumption of the relay device cannot be reduced. The power consumption of the overall communication system cannot be sufficiently suppressed.

SUMMARY

In view of the foregoing, it is an object of the present disclosure to provide a technology for reducing, in a sleep mode, power consumption of a relay device.

A relay device in an aspect of the present disclosure comprises a communication signal relay unit and a wake-up signal relay unit. The communication signal relay unit relays a communication signal flowing in connection target transmission paths that are two or more of transmission paths of the communication network system. The wake-up signal relay unit relays, by bypassing the communication signal relay unit, a wake-up signal. The wake-up signal is a signal that is received and transmitted in order to start up a node which is connected to at least one of the connection target transmission paths and which is configured to carry out transmission and reception of the communication signal, and that is transmitted using a frequency band which is lower than a communication frequency band used in transmitting the communication signal.

The communication signal relay unit includes a low frequency wave attenuation unit for attenuating a signal with a frequency band lower than the communication frequency band, and processes the signal received via the low frequency wave attenuation unit. The wake-up signal relay unit includes a wake-up signal filter unit and an output control unit. The wake-up signal filter unit is provided for each of the connection target transmission paths and passes through a signal with a frequency band lower than the communication frequency band. The output control unit is connected so that, regardless of which of the connection target transmission paths is considered to be a focus transmission path, an output of the wake-up signal filter unit provided for the focus transmission path is output to all the connection target transmission paths other than the focus transmission path.

In the above configuration, because the wake-up signal can be relayed by the wake-up signal relay unit without using the communication signal relay unit, supply of power to the communication signal relay unit can be stopped when every node is in a sleep mode in which the node does not transmit the communication signal. As a result, power consumption of the relay device in the sleep mode can be reduced, and accordingly, power consumption of an overall system can be sufficiently suppressed.

BRIEF DESCRIPTION OF THE DRAWINGS

The above and other objects, features, and advantages of the present disclosure will become more apparent from the following detailed description taken in conjunction with the attached drawings. In the drawings.

DETAILED DESCRIPTION

Embodiments will be described with reference to the drawings.

1. First Embodiment

1.1. Configuration

Figure 1:
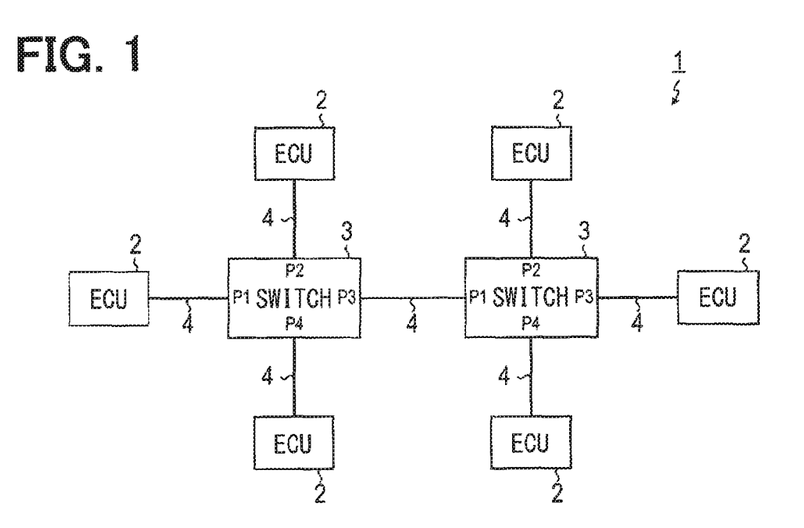
FIG. 1 is a diagram illustrating an overall configuration of a vehicle-mounted network system.

As shown in FIG. 1, a vehicle-mounted network system 1 includes electronic control units (ECU) 2, switches 3, and transmission paths 4.

The ECUs 2 are arranged to various parts of a vehicle, and function as so-called nodes in a communication network system. The ECU 2 is connected via the transmission path 4 to any of the switches 3 functioning as relay devices. The switches 3 are connected to each other via the transmission path 4.

The transmission path 4 includes a commonly-known twisted pair cable, and transmits a differential signal in accordance with Ethernet (registered trademark) standards, thereby realizing high speed communication (for example, 100 Mbps) between ECUs 2.

The ECU 2 includes a microcomputer, and executes various kinds of processing by appropriately utilizing information transmitted and received via the network system 1. The ECU 2 has a wake-up mode and sleep mode as operating modes. In the wake-up mode, the ECU 2 operates with no limitation on functions. In the sleep mode, the ECU 2 operates in a low power consumption state by limiting some of the functions, including a communication function. The ECU 2 transitions from the wake-up mode to the sleep mode when a preset sleep condition is fulfilled, such as when no transmission or reception of a communication signal used in the high speed communication (hereafter referred to simply as a "communication signal") continues for a certain period or longer. Also, the ECU 2 transitions from the sleep mode to the wake-up mode when a wake-up signal (hereafter referred to as a "WU signal") is received via the transmission path 4.

A WU signal is a signal of a sufficiently low speed (for example, in the range of kbps to tens of kbps) in comparison with a communication signal. The WU signal includes at least identification information of the ECU 2 that is a start-up target. Each ECU 2 includes a circuit that recognizes, without using the microcomputer, the identification information in a WU signal taken in from the transmission path 4. When the circuit of an ECU 2 receives a WU signal designating this ECU 2 as the start-up target node, the ECU 2 starts up the microcomputer and transitions to the wake-up mode. Also, some of the ECUs 2 includes a function to start up the microcomputer and transitions to the wake-up mode when a preset start-up condition (for example, detection of a door operation) is fulfilled, and subsequently transmits a WU signal via the transmission path 4.

1.2. Switch

Figure 2:
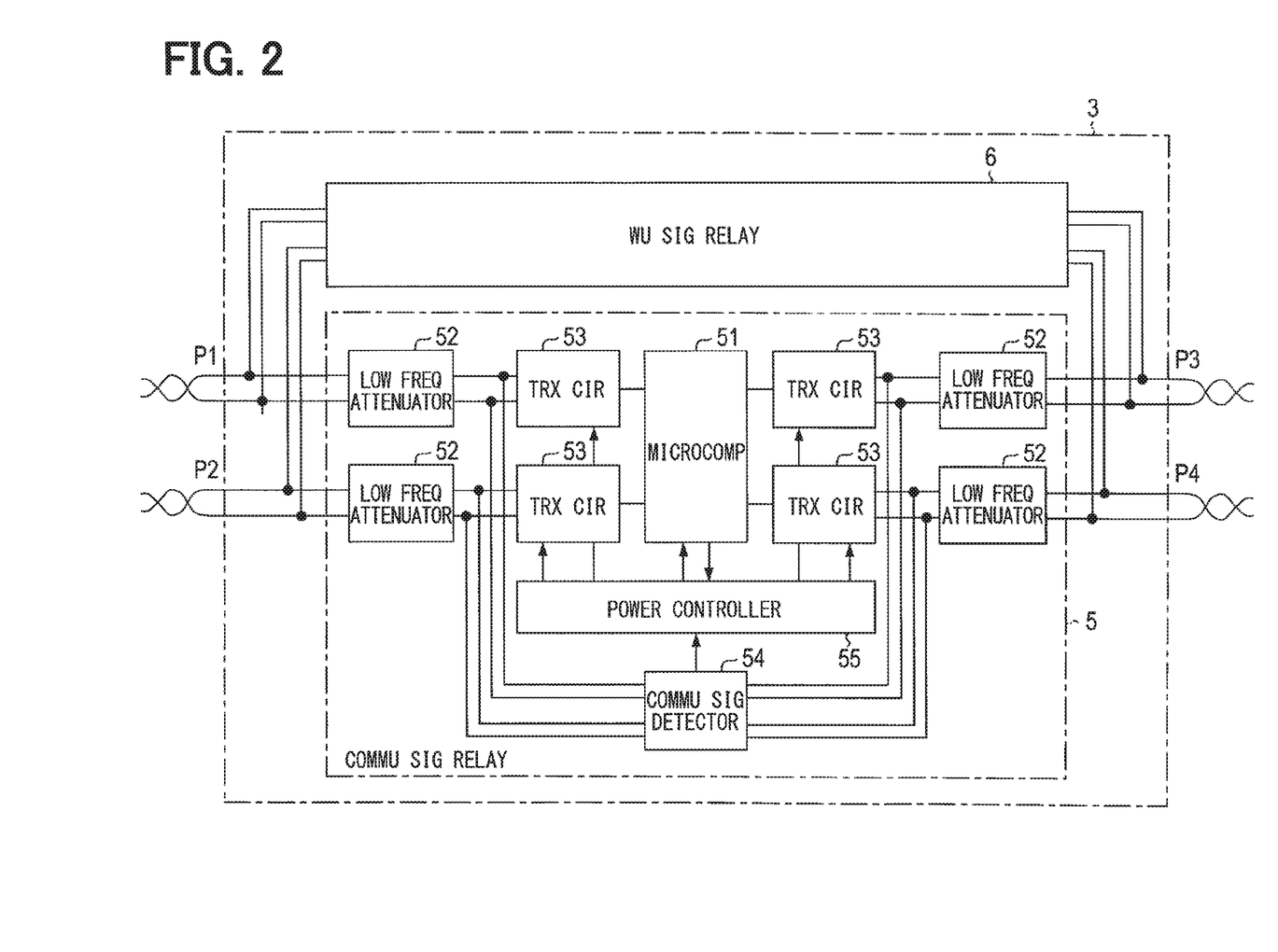
FIG. 2 is a block diagram illustrating a configuration of a switch serving as a relay device.

The switch 3 includes ports Pi (herein, i=1 to 4) connected to the transmissions path 4 that leads to the ECU 2 or another switch 3. A signal input from one of the ports Pi is relayed to another port. The transmission path 4 connected to each port Pi is also referred to as a connection target transmission path.

The switch 3 includes a communication signal relay unit 5 and a wake-up signal relay unit (hereafter referred to as a "WU signal relay unit") 6, as shown in FIG. 2. The communication signal relay unit 5 realizes a function to act as a so-called switching hub. Specifically, when a communication signal is input from any one of the ports, the communication signal relay unit 5 outputs the communication signal to the port leading to the ECU 2 that is designated as the destination in the communication signal. The WU signal relay unit 6 realizes a function of outputting and distributing the WU signal to all other ports Pj (j≠i) when a WU signal is input from any one of the ports Pi.

1.2.1 Communication Signal Relay Unit

The communication signal relay unit 5 includes a microcomputer 51, low frequency wave attenuation units 52, transceiver circuits 53, a communication signal detection unit 54, and a power supply control unit 55. The microcomputer 51 functions as a relay process unit. The low frequency wave attenuation unit 52 and the transceiver circuit 53 are provided for each port.

The low frequency wave attenuation unit 52 is a coupling capacitor or a pulse transmitter, attenuates a low frequency component (for example, several hundred kHz or less) of a signal on the transmission path 4, and supplies the attenuated signal to the transceiver circuit 53. The low frequency wave attenuation unit 52 is a commonly-known unit, which is installed in high speed typical communication in order to cut a direct current component that may cause malfunction.

The transceiver circuit 53 encodes transmission data output from the microcomputer 51 in accordance with a predetermined communication protocol, converts the data into a differential signal (that is, a communication signal), and outputs the differential signal to the transmission path 4 via the low frequency wave attenuation unit 52. Further, the transceiver circuit 53 decodes a differential signal (that is, a communication signal) received from the transmission path 4 via the low frequency wave attenuation unit 52, and outputs the differential signal to the microcomputer 51.

From a communication signal received via the transmission path 4 connected to a certain port, the microcomputer 51 extracts identification information of a destination ECU 2, identifies the port Pi connected to the transmission path 4 leading to the destination ECU 2, and outputs the received communication signal to the identified port Pi. Because of this, a memory of the microcomputer 51 pre-stores information representing a correlation between topology of the network system 1, that is, the nodes (ECUs 2), and paths in the network (the ports Pi of the switches 3). When receiving a command indicating a transition to the sleep mode via a communication signal, the microcomputer 51 supplies a sleep instruction indicating this to the power supply control unit 55.

The communication signal detection unit 54 monitors, for all the ports Pi, the level of a signal received via the low frequency wave attenuation unit 52. Upon detection of a signal level exceeding a preset threshold, the communication signal detection unit 54 supplies a detection signal indicating this, together with information identifying the detected port Pi, to the power supply control unit 55.

The power supply control unit 55 individually controls supply of power to the microcomputer 51 and each transceiver circuit 53 in accordance with a sleep instruction from the microcomputer 51 and a detection signal from the communication signal detection unit 54. Specifically, when a communication signal for the transceiver circuit 53 that is not supplied with the power by the power supply control unit 55 is detected, the supply of power to that transceiver circuit 53 is started. Also, when the microcomputer 51 is stopped, the supply of power to the microcomputer 51 is started. Because of this, transmission and reception of a communication signal via the port Pi to which the transceiver circuit 53 belongs can be carried out. At this time, th supply of power to not only the transceiver circuit 53 for which the communication signal is detected but also to all other stopped transceiver circuits 53 may be started. Also, when a sleep command is supplied from the microcomputer 51, the power supply control unit 55 stops the supply power to the transceiver circuit 53 belonging to the port Pi indicated by the sleep command. Further, when the supply of power to all the transceiver circuits 53 is stopped, the supply of power to the microcomputer 51 is also stopped.

1.2.2 Wake-up Signal Relay Unit

Figure 3:
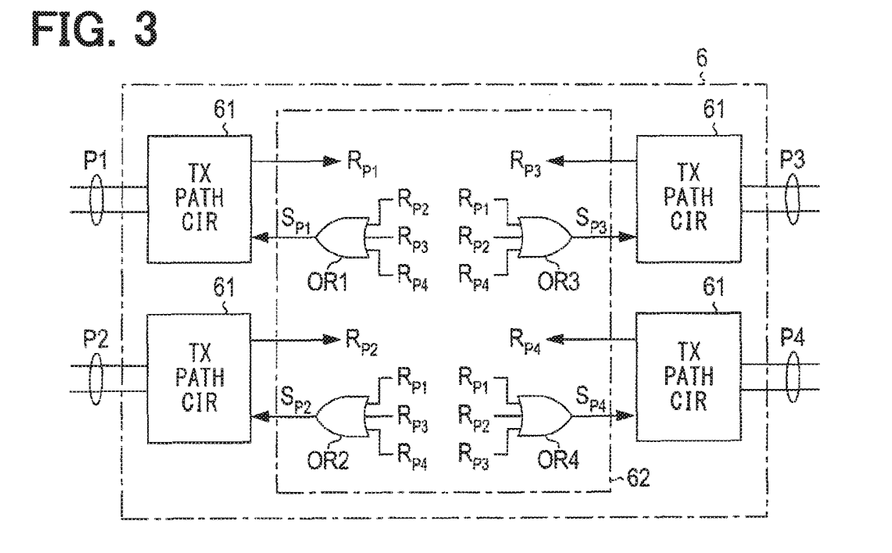
FIG. 3 is a block diagram illustrating a configuration of a wake-up signal relay unit.

As shown in FIG. 3, the WU signal relay unit 6 includes transmission path-corresponding circuits 61 provided for respective ports Pi, and an output control unit 62 connecting the transmission path-corresponding circuits 61 to each other.

Figure 4:
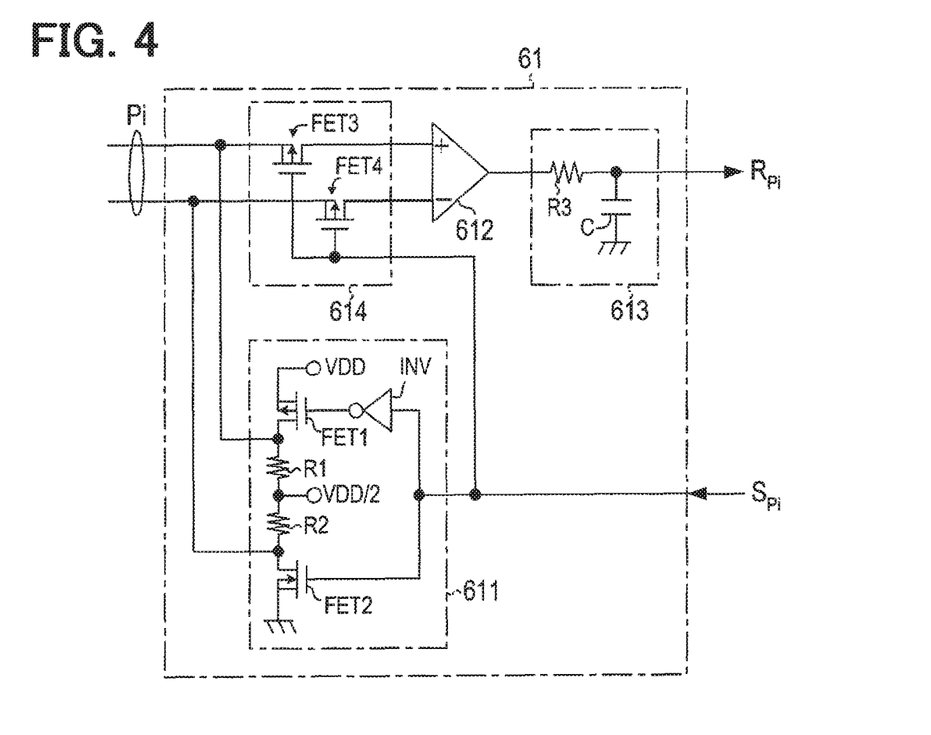
FIG. 4 is a circuit diagram illustrating a configuration of a transmission path-corresponding circuit.

As shown in FIG. 4, the transmission path-corresponding circuit 61 includes a transmission circuit 611, a reception circuit 612, a wake-up signal filter unit (hereafter referred to as a "WU signal filter unit") 613, and a sneak prevention circuit 614. Hereafter, a port connected to the transmission path-corresponding circuit 61 will be referred to as the subject port Pi.

The transmission circuit 611 includes a p-channel field effect transistor FET1, an n-channel field effect transistor FET2, resistors R1 and R2, and an inverter INV. A power supply voltage VDD (for example, 2V) is applied to the source of the FET1. The source of the FET2 is grounded. The resistors R1 and R2 are connected in series between the drain of the FET1 and the drain of the FET2. An intermediate level voltage that is one-half of the power supply voltage VDD is applied to a common connection terminal of the two resistors R1 and R2. A transmission signal Spi supplied from the output control unit 62 is applied via the inverter INV to the gate of the FET1, and the transmission signal Spi is applied directly to the gate of the FET2. Also, one signal line (also referred to as a + line) constituting the transmission path 4 connected to the subject port Pi is connected to the drain of the FET1, specifically, to a connection terminal connecting the FET1 and the resistor R1. The other signal line (also referred to as a – line) is connected to the drain of the FET2, specifically, to a connection terminal connecting the FET2 and the resistor R2.

When the transmission signal Spi is at a low level, both the FET1 and the FET2 are in an off-state, and as a result, the intermediate level voltage (VDD/2) is applied via the resistor R1 or the resistor R2 to both of the signal lines constituting the transmission path 4 connected to the port Pi. In order that the output of the transmission circuit 611 at this time can be regarded as high impedance, the resistance value of the resistors R1 and R2 is set in the range of 1 MΩ. Meanwhile, when the transmission signal Spi is at a high level, both the FET1 and the FET2 are in an on-state, and as a result, the high level voltage (the power supply voltage VDD) is applied to the + line of the transmission path 4, and the lower level voltage (the ground voltage) is applied to the – line of the transmission path 4. Consequently, the differential voltage of a differential signal on the transmission path 4 is 0V (=VDD/2−VDD/2) when the transmission signal Spi is at a low level, and VDD(=VDD−0) when the transmission signal Spi is at a high level.

The reception circuit 612 includes an operational amplifier operating as a comparator, in which the + line constituting the transmission path 4 connected to the subject port Pi is connected to a non-inverting input and the – line is connected to an inverting input. The reception circuit 612 is configured to output at a high level when the differential voltage of the transmission signal Spi is VDD/2 or higher, and at a low level when the differential voltage is lower than VDD/2.

The WU signal filter unit 613 includes a commonly-known low-pass filter with a resistor R3 and a capacitor C. The WU signal filter unit 613 extracts a low frequency component from the output of the reception circuit 612, and supplies the low frequency component as a received signal Rpi to the output control unit 62. The WU signal filter unit 613 is set so as to extract a signal in the frequency band (several hundred kHz or lower) attenuated by the low frequency wave attenuation unit 52 of the communication signal relay unit 5. That is, the WU signal filter unit 613 is configured in such a way that, even when a communication signal and a WU signal are sent to the transmission path 4 simultaneously, only the WU signal is extracted.

The sneak prevention circuit 614 includes two p-channel field effect transistors FET3 and FET4, and is inserted between the subject port Pi and the reception circuit 612. Note that the output of the transmission circuit 611 is connected to a line that connects the port Pi and the sneak prevention circuit 614. The FET3 is inserted in the + line of the transmission path 4, the FET4 is inserted in the – line of the transmission path 4, the sources of both are connected to the port Pi, and the drains of both are connected to the reception circuit 612. The transmission signal Spi is applied directly to the gates of the FET3 and the FET4.

Specifically, when the transmission signal Spi is at a low level, that is, when the output of the transmission circuit 611 is of high impedance, the reception circuit 612 is connected via the sneak prevention circuit 614 to the subject port Pi. Meanwhile, when the transmission signal Spi is at a high level, that is, when the output of the transmission circuit 611 is VDD and 0V, the reception circuit 612 is separated from the subject port Pi by the sneak prevention circuit 614.

Returning to FIG. 3, the output control unit 62 includes logical sum circuits ORi provided for respective ports Pi. Further, all received signals other than the received signal Rpi that is output from the transmission path-corresponding circuit 61 provided for the port Pi are inputted to the logical sum circuit ORi and the output of the logical sum circuit ORi is supplied as the transmission signal Spi to the transmission path-corresponding circuit 61 provided for the port Spi.

Specifically, the logical sum circuit ORi is connected in such a way that the received signal Rpi of each port Pi is supplied as a transmission signal Spj (j≠i) to all the ports Pj (j≠i) other than the subject port Pi.

In other words, when any one of the ports Pi is called a focus port, ports other than the focus port are called non-focus ports, the transmission path 4 connected to the focus port is called a focus transmission path, and the transmission paths 4 connected to the non-focus ports are called non-focus transmission paths, the output control unit 62 realizes such a connection that, whichever port Pi is adopted as the focus port, the output (the received signal Rpi) of the WU signal filter unit 613 corresponding to the focus port (that is, the focus transmission path) is output to all the non-focus ports (that is, the non-focus transmission paths).

1.3. Operation

Figure 5:
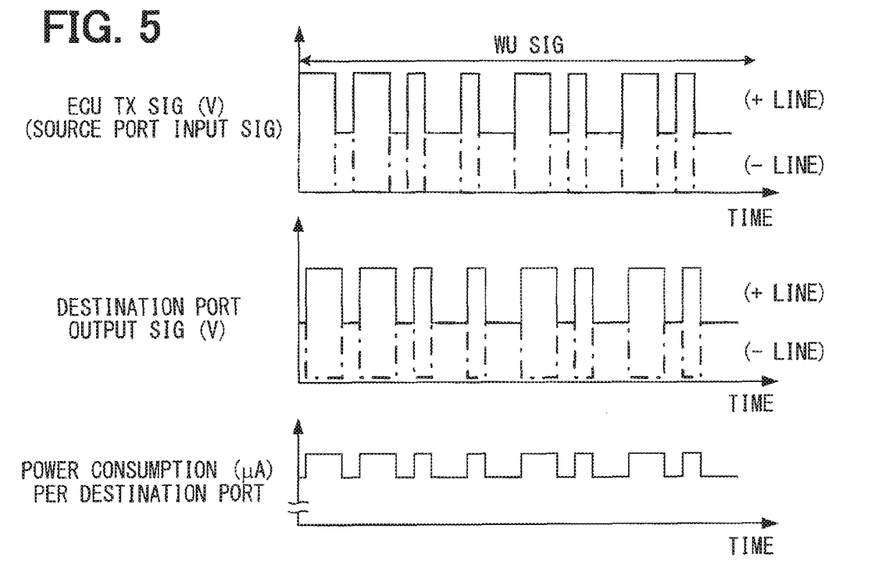
FIG. 5 is a graph illustrating a wake-up signal waveform.

FIG. 5 shows signal waveforms of respective units when any one of the ECUs 2 transmits a WU signal. FIG. 5 further shows the power consumption of the ports to which the WU signal relay unit 6 of the switch 3 distributes the WU signal.

A WU signal output from the ECU 2 is received at one port Pi of the switch 3(referred to as a transmission source port), and output from all other ports (distribution destination ports) Pj (j≠i) via the WU signal relay unit 6. At this time, when the WU signal passes through the WU signal relay unit 6, a delay occurs due to the WU signal passing through the sneak prevention circuit 614, the reception circuit 612, and the WU signal filter unit 613 relating to the transmission source port Pi, and passing through the logical sum circuit ORj and the transmission circuit 611 relating to the distribution destination port Pj. When the differential voltage of the WU signal (differential signal) is at a low level, that is, when the received signal Rpi (eventually the transmission signal Spj) is at a low level, the FET1 and FET2 constituting the transmission circuit 611 of the distribution destination port Pj are both in an off-state. Accordingly, power consumption is low. When the differential voltage of the WU signal is at a high level, that is, when the received signal Rpi (and consequently the transmission signal Spj) is at a high level, the FET1 and FET2 constituting the transmission circuit 611 of the distribution destination port Pj are both in an on-state. Accordingly, power consumption is high. At this time, the transmission signal Spi is at a low level at the transmission source port Pi, regardless of the level of the WU signal and the power consumption is maintained low.

As this kind of WU signal relay unit 6 operation is carried out independently of the communication signal relay unit 5, the power consumption of the switch 3 as a whole is the power consumption of the communication signal relay unit 5 added to the power consumption of the WU signal relay unit 6.

1.4. Advantages

According to the switch 3, a WU signal can be relayed regardless of the operational state of the communication signal relay unit 5. Because of this, it is not required that, even after all the ECUs 2 have transitioned to the sleep mode, the communication signal relay unit 5 be continuously in the started-up state in order to relay a WU signal. Consequently, power consumption in the switch 3, and as a result, power consumption in the network system 1 as a whole can be reduced.

2. Second Embodiment

As a second embodiment is basically similar to the first embodiment, description of common configurations will be omitted, and differences from the first embodiment will be mainly described.

In the first embodiment, the WU signal relay unit 6 constituting the switch 3 is continuously supplied with the power. In the second embodiment, the power is supplied only when a WU signal is detected.

2.1. Configuration

A switch 3a of this embodiment differs from the switch 3 of the first embodiment in part.

Figure 6:
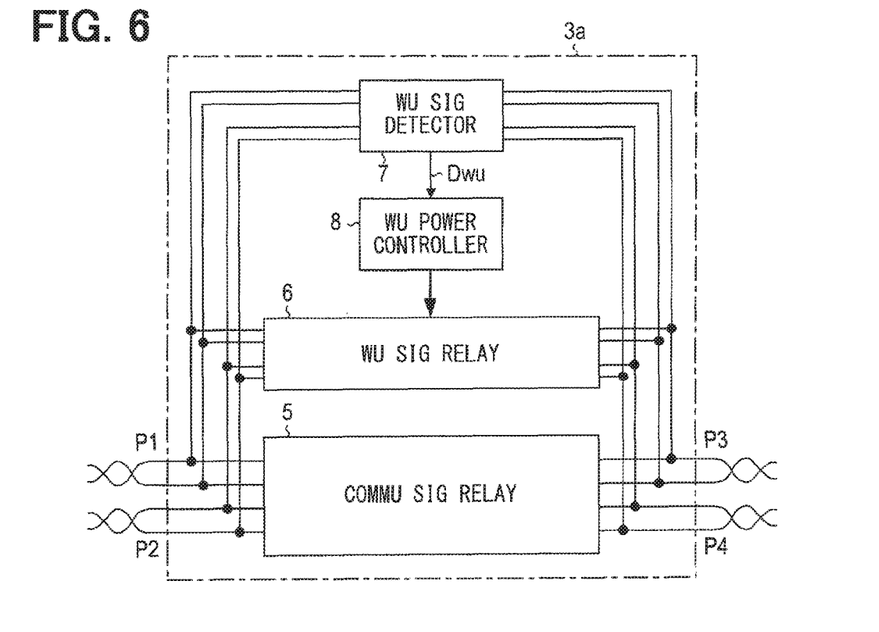
FIG. 6 is a block diagram illustrating a configuration of a switch of a second embodiment.

As shown in FIG. 6, the switch 3a includes a communication signal relay unit 5, a WU signal relay unit 6, a wake-up signal detection unit (hereafter referred to as a "WU signal detection unit") 7, and a wake-up power supply control unit (hereafter referred to as a "WU power supply control unit") 8.

Although the configurations of the communication signal relay unit 5 and the WU signal relay unit 6 are generally the same as in the first embodiment, a difference of the second embodiment from the first embodiment is that the supply of power to the WU signal relay unit 6 is not continuous but controlled by the WU power supply control unit 8.

The WU signal detection unit 7 includes filters for respective ports Pi that interrupt a communication signal and allow a WU signal to pass through. When the output level of any one of the filters exceeds a preset detection level, the WU signal detection unit 7 supplies a WU detection signal Dwu to the WU power supply control unit 8.

When receiving the WU detection signal Dwu, the WU power supply control unit 8 supplies power to the WU signal relay unit 6 for only a certain time that is needed to transmit one frame for the WU signal.

2.2. Operation

Figure 7:
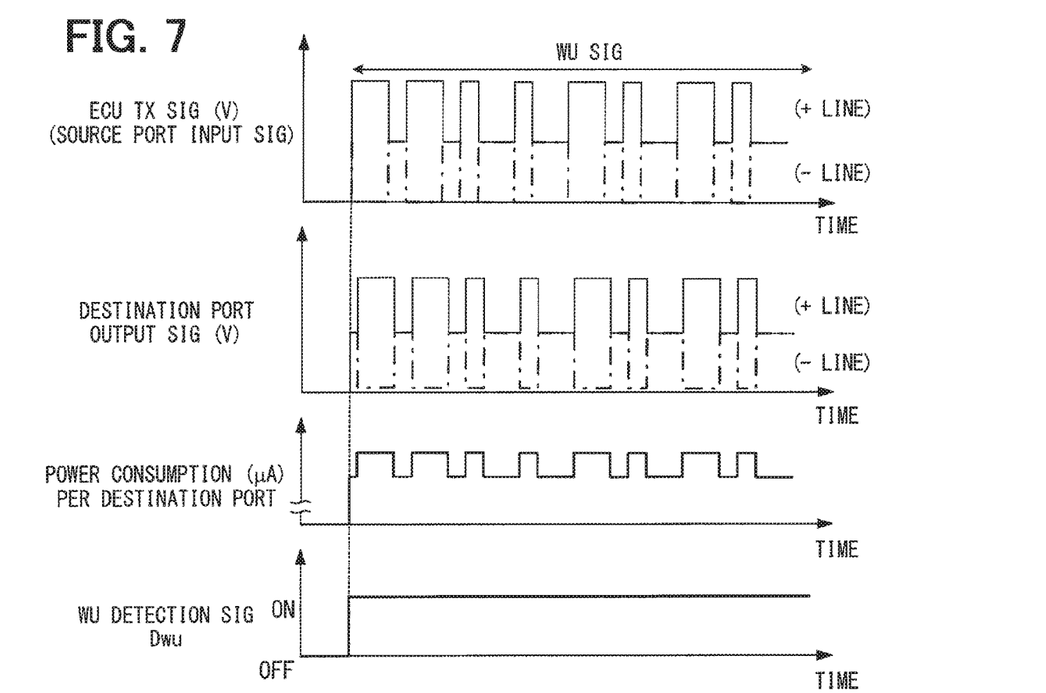
FIG. 7 is a graph illustrating a wake-up signal waveform.

According to this configuration, power consumption of the WU signal relay unit 6 is zero provided that no WU signal is detected by the WU signal detection unit 7, as shown in FIG. 7. When a WU signal is detected, the WU power supply control unit 8 starts supply of power to the WU signal relay unit 6. Because of this, relay of the WU signal by the WU signal relay unit 6 is implemented. Power consumption in the WU signal relay unit 6 at this time is the same as in the case of the first embodiment. Thereafter, when the certain time elapses, the WU power supply control unit 8 stops the supply of power to the WU signal relay unit 6. Because of this, power consumption in the WU signal relay unit 6 returns to zero.

2.3. Advantages

As heretofore described, upon receipt of a WU signal, the WU signal relay unit 6 is supplied with power for only a time period that is necessary in order to relay the WU signal. Thus, power consumption in the switch 3a and power consumption in a network system 1 as a whole can be further reduced.

3. Third Embodiment

As a second embodiment is basically similar to the first embodiment, description of common configurations will be omitted, and differences from the first embodiment will be described mainly.

In the first embodiment, supply of power to the microcomputer 51 and each transceiver circuit 53 constituting the communication signal relay unit 5 is controlled independently of a WU signal. As opposed to this, in the third embodiment, when a WU signal is detected, supply of power is controlled so that that a communication signal can be relayed using a port related to the wake-up of the WU signal.

3.1. Configuration

In this embodiment, a switch 3b differs from the switch 3 of the first embodiment in part.

Figure 8:
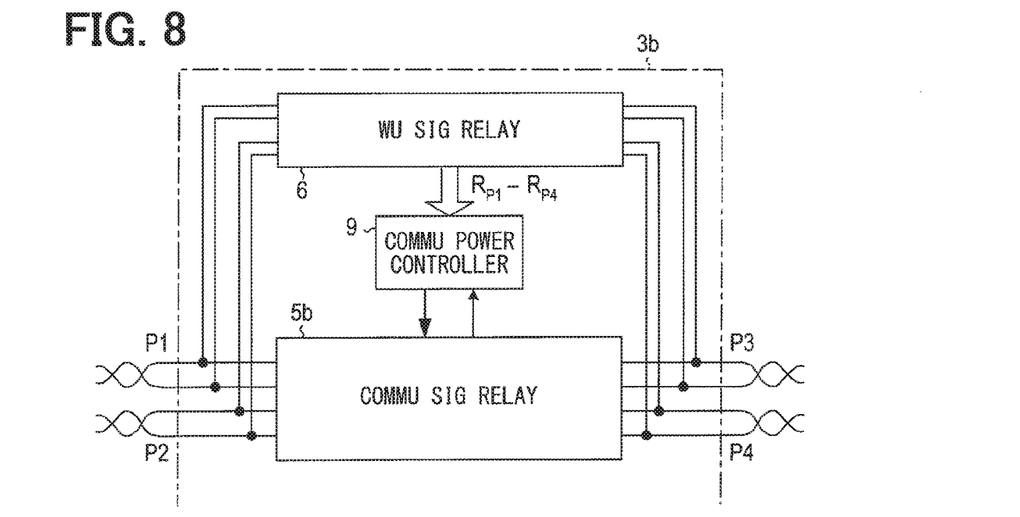
FIG. 8 is a block diagram illustrating a configuration of a switch of a third embodiment.

As shown in FIG. 8, the switch 3b includes a communication signal relay unit 5b, a WU signal relay unit 6, and a communication power supply control unit 9.

The communication signal relay unit 5b in the present embodiment is configured such that the communication signal detection unit and the power supply control unit shown in FIG. 5 as components of the communication signal relay unit 5 are omitted. The communication signal relay unit 5b controls supply of power to a microcomputer 51 and each transceiver circuit 53 under control of the communication power supply control unit 9.

Although the configuration of the WU signal relay unit 6 is generally the same as in the first embodiment, a received signal Rpi of each port Pi is supplied further to the communication power supply control unit 9.

The communication power supply control unit 9 controls supply of power to the communication signal relay unit 5b based on a received signal Rpi supplied from the WU signal relay unit 6 and a sleep command supplied from the microcomputer 51 of the communication signal relay unit 5b.

Figure 9:
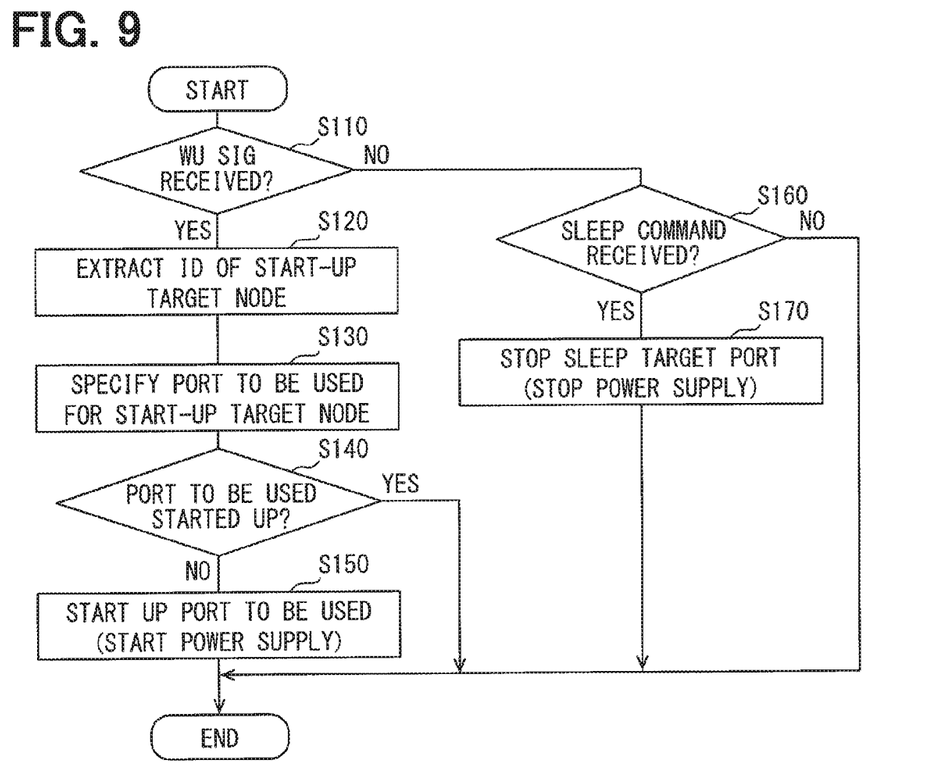
FIG. 9 is a flowchart illustrating processes executed by a wake-up signal process unit.

Details of power supply control carried out by the communication power supply control unit 9 will be described using a flowchart shown in FIG. 9. The blow processing is realized by a combination of logic circuits or the like, and is executed repeatedly.

The communication power supply control unit 9 is operating continuously. The communication power supply control unit 9 determines in S110 whether or not a WU signal has been received, that is, whether or not a received signal Rpi has been detected at any port Pi. When no received signal Rpi has been detected, the communication power supply control unit 9 determines that no WU signal has been received, and the processing proceeds to S160. Meanwhile, when a received signal Rpi has been detected, the communication power supply control unit 9 determines that a WU signal has been received, and the processing proceeds to S120.

In S120, the communication power supply control unit 9 analyzes the contents of the detected received signal Rpi, and extracts identification information identifying a start-up target node.

In the following S130, the communication power supply control unit 9 identifies a port Pj to be used, which is the port leading to the start-up target node, based on information representing topology of a network system. The information representing topology of a network system is the same as that stored in the microcomputer 51.

In the following S140, the communication power supply control unit 9 determines whether or not power is being supplied to the transceiver circuit 53 corresponding to a transmission source port Pi and the transceiver circuit 53 corresponding to the port Pj to be used identified in S130. In the above, the transmission source port Pi is the port at which the WU signal has been received. When power is already being supplied to both ports Pi and Pj, the processing is ended. When there is a port that is not being supplied with power, the communication power supply control unit 9 starts supply of power to the port that is not being supplied with power in S150, and when power is not being supplied to the microcomputer 51, the communication power supply control unit 9 also starts supply of power to the microcomputer 51, and then, the processing is ended.

In S160, the communication power supply control unit 9 determines whether or not there is a sleep command from the microcomputer 51. When there is no sleep command, the processing is ended. When there is a sleep command, the processing proceeds to S170.

In S170, the communication power supply control unit 9 stops the supply of power to the transceiver circuit 53 of the port that is the target of the sleep command, and then, the processing is ended. When this results in the stop of the supply of power to all the transceiver circuits 53, the communication power supply control unit 9 also stops the supply of power to the microcomputer 51.

3.2. Advantages

According to this configuration, when a WU signal is relayed, supply of power to the transceiver circuits 53 of the ports Pi and Pj used in relaying a communication signal between a transmission source ECU of the WU signal and a start-up target ECU is also started.

As a result of this, when ECUs 2 wake up, relay of communication signals transmitted and received between the ECUs 2 can be started promptly.

The wake-up signal detection unit 7 and the WU power supply control unit 8 in the switch 3a of the second embodiment may be added to the switch 3b of this embodiment, and the WU signal relay unit 6 may be supplied with power and operates only when a WU signal is detected.

4. Other Embodiments

Although embodiments have been illustrated, the above-illustrated embodiments are not limiting. Examples of other embodiments will be given.

Figure 10:
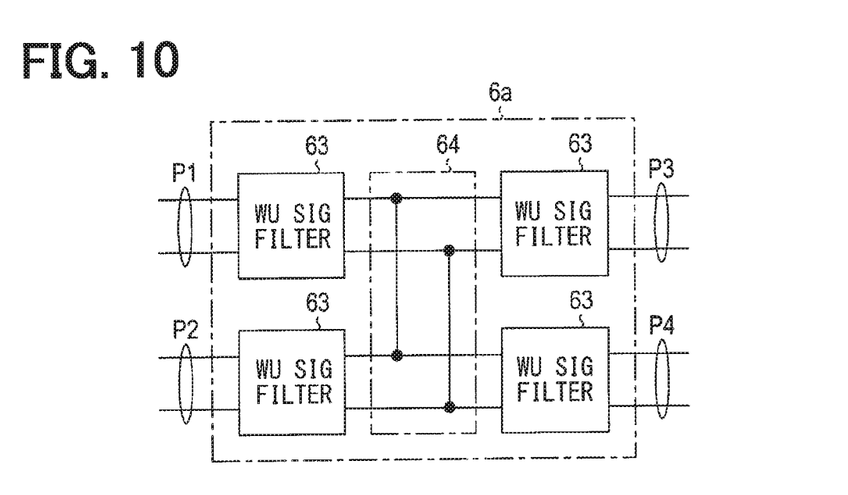
FIG. 10 is a block diagram illustrating a configuration of a wake-up signal relay unit of a modification.

1. The WU signal relay unit 6 is used in the first embodiment, but a WU signal relay unit 6a shown in FIG. 10 may be used instead. The WU signal relay unit 6a includes a WU signal filter unit 63 that is provided for each port, and an output control unit 64 that connects the outputs of the WU signal filter units 63 to each other. The WU signal filter unit 63 includes a commonly-known low-pass filter used in a two-wire type signal line, and designed to have the same characteristics as the WU signal filter unit 613. In this case, the device can be configured more simply.

2. A function of one component in the heretofore described embodiment may be distributed among components, or functions of components may be integrated in one component. Part of the configuration of the heretofore described embodiment may be omitted. Also, at least part of the configuration of the heretofore described embodiment may be added to or replace with the configuration of another one of the heretofore described embodiments.

3. In addition to the switch (relay device) 3 and the vehicle-mounted network system 1, various embodiments may be possible. For example, embodiments may be various network systems other than a vehicle-mounted network system. Embodiments may be a wake-up signal relay method.

What is claimed is:

1. A relay device comprising:
   a communication signal relay unit for relaying a communication signal flowing in any of connection target transmission paths that are two or more of transmission paths of a communication network system; and
   a wake-up signal relay unit for relaying, by bypassing the communication signal relay unit, a wake-up signal that
   (A) is received and transmitted in order to start up a node which is connected to at least one of the connection target transmission paths and which is configured to carry out transmission and reception of the communication signal, and
   (B) is transmitted using a frequency band which is lower than a communication frequency band used in transmitting the communication signal,
   wherein the communication signal relay unit includes a low frequency wave attenuation unit for attenuating a signal with a frequency band lower than the communication frequency band, and processes the signal received via the low frequency wave attenuation unit,
   wherein the wake-up signal relay unit includes:
   a wake-up signal filter unit, provided for each of the connection target transmission paths, for passing through a signal with a frequency band lower than the communication frequency band; and
   an output control unit that is connected so that, regardless of which of the connection target transmission paths is considered to be a focus transmission path, an output of the wake-up signal filter unit provided for the focus transmission path is output to all the connection target transmission paths other than the focus transmission path.

2. The relay device according to claim 1, wherein the wake-up signal relay unit further includes:
   a transmission circuit for transmitting a signal to the focus transmission path in accordance with a signal supplied from the output control unit;
   a reception circuit for receiving a signal from the focus transmission path;
   a sneak prevention circuit for operating in accordance with a signal supplied from the output control unit and preventing sneaking of a signal from the transmission circuit to the reception circuit; and
   an transmission path-corresponding circuit, provides for each of the connection target transmission paths, for supplying, to the output control unit, a received signal that has passed through the reception circuit and the wake-up signal filter unit,
   wherein the output control unit connects the transmission path-corresponding circuits to each other so that each transmission path-corresponding circuit is supplied with an output of a logical sum of the received signals of the other transmission path-corresponding circuits.

3. The relay device according to claim 1, wherein:
   each wake-up signal filter unit has a first connection terminal and a second connection terminal opposite to each other;
   the first connection terminal of each wake-up signal filter unit is connected to a corresponding one of the connection target transmission paths; and
   the output control unit simply connects the second ends of the wake-up signal filter units each other.

4. The relay device according to claim 1, further comprising:
- a wake-up signal detection unit for detecting the wake-up signal; and
- a wake-up power supply control unit that, upon detection of the wake-up signal by the wake-up signal detection unit, carries out supply of power to the wake-up signal relay unit at least until relay of the wake-up signal ends.

5. The relay device according to claim 1, further comprising:
- a start-up target identification unit for, based on the wake-up signal received by the wake-up signal relay unit, identifying a transmission source transmission path and a reception destination transmission path, wherein the transmission source transmission path is one of the connection target transmission paths that is connected to a node that is a transmission source of the wake-up signal, wherein the reception destination transmission path is another of the connection target transmission paths that leads to another node that is a start-up target of the wake-up signal; and
- a communication power supply control unit for controlling supply of power to the communication signal relay unit, wherein the communication signal relay unit further includes:
- a transceiver circuit, provided for each of the connection target transmission paths, for transmitting and receiving the communication signal; and
- a relay process unit, provided for each of the transceiver circuits, for executing a relay process of transmitting the communication signal received via a corresponding transceiver circuit to one of the connection target transmission paths that is connected to a node that is a destination of the communication signal, wherein the communication power supply control unit individually stops supply of power to the transceiver circuits and the relay process units constituting the communication signal relay unit in accordance with a command from the relay process unit, and individually starts supply of power to the transceiver circuits and the relay process units that are provided for the transmission source transmission path and the reception destination transmission path identified by the start-up target identification unit.

* * * * *